Oct. 2, 1951  J. C. HOOYKAAS  2,569,718
BACK-PEDALING BRAKING HUB

Filed May 31, 1949

Patented Oct. 2, 1951

2,569,718

UNITED STATES PATENT OFFICE 2,569,718
BACK-PEDALING BRAKING HUB

Johannes C. Hooykaas, The Hague, Netherlands, assignor to Fijn-Mechanische Industrie "Becker's Sons" N. V., The Hague, Netherlands Application May 31, 1949, Serial No. 96,196
In the Netherlands June 25, 1948

3 Claims. (Cl. 192—6)

The invention relates to a back-pedalling braking hub comprising a non-rotary shaft, a driving member being rotatably mounted on said shaft and provided with a driving sprocket wheel or the like, a cone fixed on said shaft, a wheel hub coaxially surrounding said shaft and being rotatably supported at one end by said driving member and at the other end by said cone, a brake surrounding said shaft inside said hub, a brake actuating and clutching member provided with coupling faces and mounted inside the hub and a slip coupling, said brake actuating and clutching member being associated with the shaft through said slip coupling and adapted to move on said driving member along a helical path, so that during normal driving, due to forward rotation of the driving member, the brake actuating and clutching member is disengaged from the brake and establishes a coupling between the wheel hub and the driving member, but during braking, due to backward rotation of the driving member, said brake actuating and clutching member is moved towards and actuates the brake, and said slip coupling being provided with non-rotary radially resilient friction means, which permanently engage said brake actuating and clutching member.

In back-pedalling braking hubs of this type the construction of the slip coupling is of great importance, as the reliability of the brake substantially depends on this coupling. During forward driving the slip coupling slides, but during the braking operation, that means during backward driving of the driving member or during shifting from the braking position to the clutching position, when driven forward, the brake actuating and clutching member has to be prevented from rotation with respect to the shaft so as to allow this member of being screwed in one or the other direction on the driving member and either coupled with the brake or with said driving member. Consequently, the slip coupling has to meet opposite requirements. In order to keep the friction low during normal driving the coupling must easily slip, but in order to prevent that during backward rotation of the driving member the brake actuating and clutching member is rotated together with the driving member and thereby the brake is not actuated, the slip coupling has to hold the brake actuating and clutching member firmly as soon as said member has been moved from the clutching position. The same applies when said member is shifted from the braking position to the clutching position, that means when said member is displaced in opposite direction.

Up till now the slip coupling was constituted by blade springs, which were attached to the brake actuating and clutching member and slid under some pressure across the external or the internal surface of a non-rotary ring. It has been found, however, that slip couplings of this construction wear easily and soon have too little friction to hold the brake actuating and clutching member firmly, when it is shifted from one end position to the other end position and vice versa. As a consequence thereof the free braking stroke soon becomes indefinite.

The invention has for its object to provide an improved back-pedalling braking hub which avoids the disadvantages of the known braking hubs. It consists in that the friction means of the slip coupling are constituted as brake shoes which are in sliding engagement with an annular groove of the brake actuating and clutching member. The use of individual brake shoes makes it possible to better adapt the shape and the material of the frictionally cooperating parts of the slip coupling to practical requirements than the use of blade springs. The brake shoes remain in contact with the walls of the groove only. The result thereof is a very constant friction. Moreover, this construction has the advantage that the axial dimension of the brake actuating and clutching member may be reduced and a relatively small friction area of said member has to be worked.

The brake shoes may be formed as ring segments having a triangular cross-section and the annular groove of the brake actuating and clutching member may have a corresponding triangular cross-section. The brake shoes may be kept under pressure in the groove by a non-rotary split resilient ring having axially projecting parts, which are in axially sliding engagement with recesses of a non-rotary part, e. g. the first brake plate or the so-called brake cone.

Very good results have been obtained with brake shoes made of organic substance, e. g. synthetic resin incorporating a filler of textile fibres or the like. Also wooden brake shoes may be used.

For the elucidation reference is made to the drawing illustrating the part of a back-pedalling braking hub provided with the improvement according to the invention.

Figure 1:
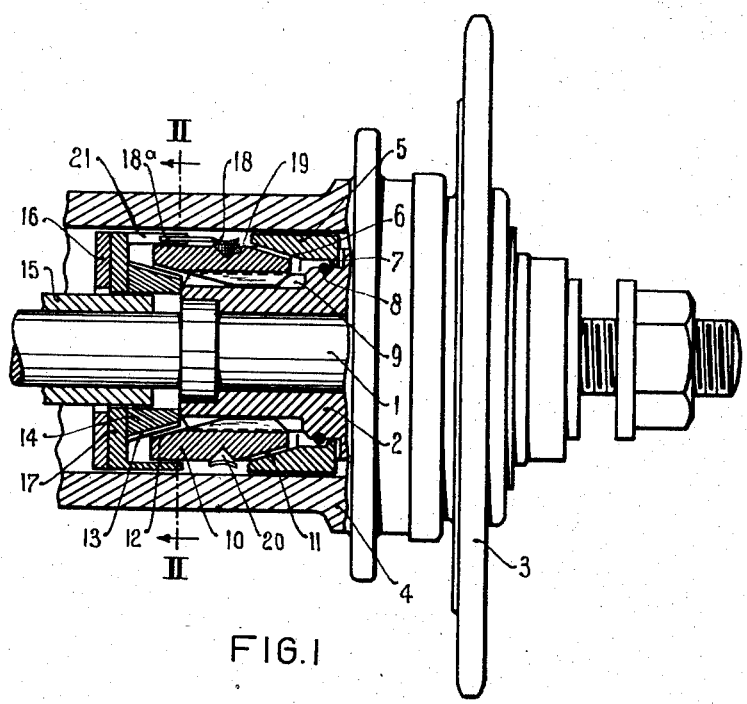
Fig. 1 shows a longitudinal sectional view of said part.
Figure 2:
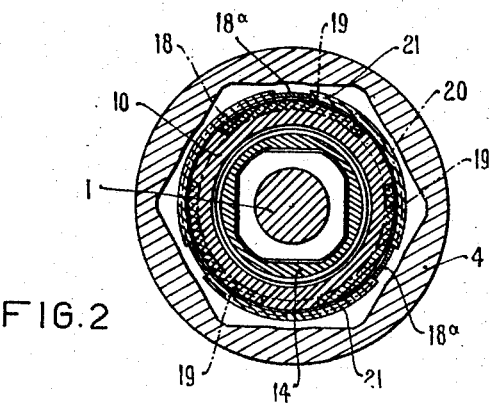
Fig. 2 is a cross-sectional view on line II—II in Fig. 1.

In the drawing 1 designates a non-rotary shaft of the back-pedalling braking hub. Rotatably mounted about this shaft is a driving member 2, which is provided with a sprocket wheel 3 for the driving chain. The hub 4 of the wheel is rotatably supported by said driving member 2. This hub has a hexagonal internal cross-section and contains a fitting hexagonal ring 5 having an internal conical active face 6. This ring is adapted to rotate about the driving member 2 and is limited in its axial movement with respect to the driving member by a shoulder 7 and a resilient ring 8. The part of the driving member projecting inwards is provided with a thread 9 and supports a brake actuating and clutching member 10 which is screwed thereon. This member has an external conical face 11, which cooperates with the conical face 6 of the ring 5, and an internal conical face 12, which cooperates with the external conical face 13 of the so-called brake cone 14. This brake cone is mounted axially slidably but non-rotatably on a sleeve 15 fixed to the shaft 1. Behind the brake cone 14 plates 16 of a plate brake are mounted on the sleeve 15. These plates are alternately associated with said sleeve 15 and with the wheel hub 4 in such a manner that they are adapted to slide in axial direction but are prevented to rotate with regard to the respective parts 15 and 4. Provided between the brake cone 14 and the first plate 16 of the brake is a ring 17 having an axially projecting rim. This ring may slide but cannot rotate with respect to the sleeve 15. A split clamping ring 18 having axially projecting parts 18a made of spring steel is provided round three loose brake shoes 19 and forces said shoes in an annular groove 20 of the brake actuating and clutching member 10. The parts 18a so engage recesses 21 in the outer rim of ring 17, that the brake actuating and clutching member together with the brake shoes and the clamping ring is adapted to be axially displaced freely, that means without any friction with respect to ring 17 and the brake cone 14.

This back-pedalling brake operates as follows:

When the driving member 2 is driven forward the brake actuating and clutching member 10, which is prevented to rotate about the non-rotary shaft 1 by the brake shoes 19, is screwed on the driving member and moved thereby to the right with its conical face 11 into engagement with the conical face 6 of ring 5. Since the ring 5 cannot rotate with respect to the wheel hub 4 a coupling between the driving member and said hub is established and the wheel is driven. During driving of the wheel the brake actuating and clutching member 10 and the driving member rotate together and the brake shoes 19 slide in the groove 20.

If during normal driving the pedals are kept stationary, so that the driving member is stopped, the brake actuating and clutching member 10 is screwed to the left by the rotating hub 4 through ring 5, till said member 10 is released from said ring. The member 10 is then kept stationary by the brake shoes 19 and remains in the so-called free wheel position.

When during the braking operation thereafter the driving member 2 is rotated backward the member 10, held against rotation by the braking shoes, is screwed farther to the left and finally contacts the conical face 13 of the brake cone 14 with its conical face 12. The brake cone holds the brake actuating and clutching member 10 firmly, so that when the backward rotation of the driving member 2 is continued the brake actuating and clutching member 10 and the brake cone 14 are forced to the left whereby the brake is actuated.

When thereafter the pedals are again driven in forward direction, first the brake is released, then the member 10, held against rotation by the brake shoes 19, is screwed again to the right and finally the coupling between the driving member 2 and the wheel hub 4 is reestablished.

The brake shoes may be made of organic material, e. g. synthetic resin (novotex), incorporating a filler of textile or like material. Braking shoes of this kind appear to have hardly any friction when sliding, consequently, during normal forward driving of the hub. This friction, however, increases considerably as soon as the brake shoes 19 and the brake actuating and clutching member 10 are stationary with respect to one another. It will be apparent that these facts are of essential importance for a reliable operation of the braking hub, since during normal driving the friction in the hub must be a minimum, but the member 10 has to be held against rotation firmly as soon as it is in its free wheel position or during shifting from one position to the other and vice versa. Wear of these brake shoes appears to affect the operation of the slip coupling hardly or not at all.

What I claim is:

1. A back-pedalling braking hub provided with a freewheel and comprising, in combination, a non-rotary shaft, a driving member having a threaded cylindrical portion and being rotatably mounted on said shaft, a wheel hub surrounding said shaft and being rotatably supported by said shaft and said driving member, a clutching member screwed on the threaded portion of the driving member and adapted to be axially displaced by the relative rotation of said threaded portion, a slip coupling permanently interconnecting said clutching member and an axially slidable non-rotary member, radially resilient means pressing the cooperating friction surfaces of said slip coupling to one another, some of said friction surfaces being formed on the faces of an annular groove formed in one of said permanently interconnected members and the remaining friction surfaces being formed on individual friction shoes formed as ring segments snugly fitting said groove and being held in place by said radially resilient means, which are supported by the other of said permanently interconnected members, and a brake mounted inside the wheel hub, said clutching member being screwed towards the driving member on forward rotation of the latter thereby establishing a coupling between said driving member and the wheel hub, but being unscrewed from the driving member towards the brake on backward rotation thereby actuating the brake.

2. A back-pedalling braking and freewheel hub as claimed in claim 1, in which the friction shoes are loose parts, the axially slidable non-rotary member having axial projections spaced apart by recesses and a split resilient ring being provided, said ring surrounding said friction shoes, holding them in place in the annular groove and having axially projecting parts, which are in axially slidable engagement with the recesses between the axial projections of said non-rotary member.

3. A back-pedalling braking and freewheel hub as claimed in claim 1, in which the individual ring segments forming the friction shoes and the annular groove have corresponding triangular cross-sections.

JOHANNES C. HOOYKAAS.

REFERENCES CITED

The following references are of record in the file of this patent:

UNITED STATES PATENTS

| Number | Name | Date |
| --- | --- | --- |
| 1,100,930 | Van Deren | June 23, 1914 |
| 2,081,566 | Winkler | May 25, 1937 |

FOREIGN PATENTS

| Number | Country | Date |
| --- | --- | --- |
| 28,513 | Denmark | Sept. 14, 1921 |